UNITED STATES PATENT OFFICE.

BRUNO RICHARD SEIFERT AND FRIEDRICH TODTENHAUPT, OF RADEBEUL, NEAR DRESDEN, GERMANY, ASSIGNORS TO CHEMISCHE FABRIK VON HEYDEN, AKTIEN-GESELLSCHAFT, OF RADEBEUL, NEAR DRESDEN, GERMANY.

PROCESS FOR THE MANUFACTURE OF CELLULOSE ESTERS OF FATTY ACIDS.

1,051,165.

Specification of Letters Patent. Patented Jan. 21, 1913.

No Drawing. Application filed November 29, 1910. Serial No. 594,658.

*To all whom it may concern:*

Be it known that we, BRUNO RICHARD SEIFERT, chemist, a subject of the King of Saxony, and resident of Albertstrasse 6b, Radebeul, near Dresden, Kingdom of Saxony, German Empire, and FRIEDRICH TODTENHAUPT, chemist, a subject of the King of Prussia, and resident of Sedanstrasse 5, Radebeul, near Dresden, Kingdom of Saxony, German Empire, have invented a new and useful Improvement in the Process for the Manufacture of Cellulose Esters of Fatty Acids, of which the following is a specification.

The manufacture of acetic esters of cellulose has hitherto been effected in different ways. The first method was to cause dehydrated salts of acetic acid and acetyl chlorid to act upon cellulose or allied products (hydrocellulose and the like). Another old method consisted in causing acetic acid anhydrid, with or without a diluent, to act upon the different celluloses, sulfuric acid being employed as a condensing agent. In order to obtain technically useful triacetyl compounds in this way care must be taken that the temperature does not rise to 50° C. or more (German Patent 159524), as at such temperature the sulfuric acid will destroy cellulose as well as the cellulose esters formed.

In the specification of British Patent No. 10243 of 1903, it is proposed to acetylize cellulose by acetic anhydrid and glacial acetic acid with addition of a suitable mineral acid chlorid, and as suitable mineral acid chlorids the chlorids of phosphoric acid are specified. The invention set forth in the said Patent No. 10243 of 1903 does not refer generally to the employment of any mineral acid chlorid whatever, but only to the chlorids of phosphoric acid, as only these are said to be suitable for the purpose. The process already fails if these suitable chlorids of phosphoric acid are substituted by the nearest allied chlorid, viz. that of the phosphorous acid, $PCl_3$. If 1, 7 or even 2, 6 parts by weight of phosphorous trichlorid are added to 10 parts of cellulose in the form of cotton fleece, 30 parts of glacial acetic acid and 30 parts of acetic anhydrid (the proportions given in the example of the Patent 10243 of 1903) and heated during 8 hours to 55° C., most of the cotton remains unchanged and part of it is hydrolized. It is therefore a remarkable fact, which we have found, that the chlorids of sulfuric acid act much better than even the chlorids of phosphoric acid, and give a product of great technical value. When working according to the directions of the said Patent 10243 of 1903 a dark colored, gelatinous substance is obtained, which, in the further course of manufacture, gives a yellowish brown acetyl cellulose, only partially soluble in chloroform. If, on the contrary, instead of phosphoric acid chlorid, 1 part by weight of sulfuryl chlorid is added to the same quantities of cellulose, acetic anhydrid and glacial acetic acid, a short heating up to 55° to 60° C. is sufficient to obtain in about half an hour a solution which is as clear as water.

While sulfuric acid at and above 50° C. destroys the solution of acetyl cellulose *in statu nascendi* by decomposing it and rendering it dark, and while phosphorous oxychlorid and phosphorous pentachlorid at about 55° C. yield dark, gelatinous substances in 7 to 8 hours, sulfuryl chlorid, when heated to 50° to 80° C. in the course of a short time (½ to 2 hours) gives solutions of much lighter color than those obtained by sulfuric acid at a temperature less than 50° C. Sulfuryl chlorid does not decompose cellulose and acidyl cellulose as violently as sulfuric acid and phosphoric chlorid do, and therefore no special precautions are necessary. Another advantage of the process is, that good and technically useful solutions of acetyl cellulose can be obtained by employing only one half and even less of the quantity of acetic anhydrid than when acetylizing with sulphuric acid at ordinary temperature.

Example 1: 10 parts by weight of cellulose in the form of cotton, wood cellulose or any other cellulose products, are heated to 50° to 80° C. together with 18 to 20 parts of acetic anhydrid, about 40 to 80 parts of glacial acetic acid and one part of sulfuryl chlorid, until complete solution is effected. It is also possible to work with sulfuryl chlorid without heating, if its quantity is increased. The solution takes place in some days (4–8), without substantial raising of the temperature. The sulfuryl chlorid may be substituted wholly or in part by other chlorids of sulfuric acid, e. g. pyrosulfuryl chlorid, chlorosulfonic acid or the like.

Example 2: 10 parts by weight of cellulose are soaked with 25 parts of acetic anhydrid, 40 to 80 parts of gacial acetic acid and 1 part of pyrosulfuryl chlorid. If the temperature is kept below 30° C., solution (acetylation) is complete in 24 to 48 hours.

The proportions given in the above examples may be varied, the acetic acid may be replaced by other fatty acids, and the acetic anhydrid by other anhydrids of fatty acids. The formic acid ester can be produced without any difficulty, by using concentrated formic acid and a chlorid of sulfuric acid.

Example 3: 10 parts by weight of cellulose are soaked with 50 parts or more of formic acid of 98 to 100 per cent. strength and 2 to 3 parts of sulfuryl chlorid. Solution is complete in one or two days. Instead of cellulose, hydrocellulose and similar cellulose compounds may be employed.

In the process described in the foregoing examples, other well known or approved diluents may be added or a diluent may be altogether omitted.

We have further found it to be very advantageous not to employ cellulose (e. g. cotton) in the ordinary air dried state, but to free it from all moisture by drying it perfectly, by artificial means, for instance at a temperature of about 105° C.

What we claim is:

1. The process of producing cellulose esters of fatty acids, which consists in treating cellulose with fatty acid anhydrids in presence of a chlorin derivative of sulfuric acid, substantially as and for the purpose specified.

2. The process of producing cellulose esters of fatty acids, which consists in treating cellulose, perfectly dried by artificial means, with fatty acid anhydrids in presence of a chlorin derivative of sulfuric acid, substantially as and for the purpose specified.

In testimony, that we claim the foregoing as our invention, we have signed our names in presence of two witnesses, this 18th day of November 1910.

BRUNO RICHARD SEIFERT.
FRIEDRICH TODTENHAUPT.

Witnesses:
PAUL ARRAS,
CLÄRE SIMON.